United States Patent
Turner et al.

(10) Patent No.: US 6,888,265 B2
(45) Date of Patent: May 3, 2005

(54) MOTOR VEHICLE IMMOBILIZER WITH KEY-IN WARNING RESPONSIVE TO IGNITION STATE

(75) Inventors: Douglas D. Turner, Lake Orion, MI (US); Frederick J. Berg, Auburn, MI (US); Laurence F Matola, Lake Orion, MI (US)

(73) Assignee: Delphi Technologies, Inc., Troy, MI (US)

( * ) Notice: Subject to any disclaimer, the term of this patent is extended or adjusted under 35 U.S.C. 154(b) by 169 days.

(21) Appl. No.: 10/243,615

(22) Filed: Sep. 13, 2002

(65) Prior Publication Data

US 2004/0051379 A1 Mar. 18, 2004

(51) Int. Cl.[7] .............................................. B60R 25/00
(52) U.S. Cl. ...................... 307/10.2; 307/9.1; 307/10.1; 340/457
(58) Field of Search ................................ 307/10.2, 9.1, 307/10.1; 340/457

(56) References Cited

U.S. PATENT DOCUMENTS

| 5,659,291 A | 8/1997 | Kennedy et al. | ............ 340/457 |
| 5,744,874 A | * 4/1998 | Yoshida et al. | ............ 307/10.1 |
| 5,831,520 A | * 11/1998 | Stephan | ...................... 340/457 |
| 6,144,112 A | * 11/2000 | Gilmore | .................... 307/10.2 |
| 6,492,744 B1 | 12/2002 | Rudolph et al. | |

* cited by examiner

Primary Examiner—Robert L. DeBeradinis
(74) Attorney, Agent, or Firm—Stefan V. Chmielewski

(57) ABSTRACT

An immobilizer monitors the ignition status of a motor vehicle, in a low power sleep mode or while performing other tasks, and is responsive to a change in ignition status between an off state and an on state to become active from the sleep mode or to interrupt the other tasks. If the change is to an on state, the immobilizer initiates ignition control module interrogation of an ignition control module to check for a valid key in the ignition, authorizes or prevents engine operation according to the result and returns to the sleep mode when finished. If the change is to the off state, the immobilizer again initiates ignition control module interrogation of the ignition control module to check for a valid key in the ignition and sets a key in status datum true or false according to the result. Either the immobilizer itself or a separate body computer responsive to the key in status datum provides a key in ignition warning when a key in status datum of true is detected simultaneously with an open driver door. When the key in status datum is set false, the immobilizer returns to sleep mode or its other tasks.

8 Claims, 2 Drawing Sheets

MOTOR VEHICLE IMMOBILIZER WITH KEY-IN WARNING RESPONSIVE TO IGNITION STATE

TECHNICAL FIELD

The technical field of this invention is an immobilizer and warning device for a motor vehicle.

BACKGROUND OF THE INVENTION

Many motor vehicles have a mechanical key-in-ignition switch built into the ignition control module that may be used to help generate a variety of functions for the comfort, convenience and security of the driver and passengers of a vehicle. For example, this switch may be used in combination with a door open switch to initiate a warning signal to the driver if the key is left in the ignition switch when the driver's door is opened, as required by section 114 of the Federal Motor Vehicle Safety Standards (FMVSS 114). When the key is in the ignition switch an electric signal, generated by the key-in-ignition switch, is sent to a micro-controller indicating the presence of the key in the ignition switch module. When the driver's door is opened, another switch, the driver's door ajar/jamb switch, changes state. This state change is also detected by the micro-controller. If the micro-controller still detects the presence of the ignition key, it will command a warning chime to be turned on to notify the driver that the key is still in the vehicle.

SUMMARY OF THE INVENTION

The method and apparatus of this invention provides security for a motor vehicle having propulsion apparatus and an ignition system having an on state providing electric power for operation of the propulsion apparatus and an off state withholding electric power from the propulsion apparatus, the ignition system further having a receptor for an ignition control key. According to the invention, the ignition system is monitored to detect a change between the on state and the off state. Responsive to a detected change in the ignition state, electromagnetic communication apparatus in the receptor is initiated for interrogation and validation of a key therein with reference to stored security data. If the detected change in the ignition state is from the off state to the on state, vehicle engine operation is authorized if a key in the receptor is validated and vehicle engine operation is prevented if no such key is validated. If the detected change in the ignition state is from the on state to the off state, a key in status datum is generated having a first value if a key in the receptor is validated and a second value if no such key is validated.

A key in status datum with the first value, when existing simultaneously with a detected open state of a predetermined vehicle door to trigger generation of a warning signal indicating that a key is left in the ignition with the vehicle engine not operating and the predetermined vehicle door open. This may all be accomplished by a single module; or the warning signal may be generated by a body computer or other controller responsive to the key in status datum provided by an immobilizer module. The constant monitoring of the ignition switch status for ignition switch changes between an on state and an off state permits optimal compliance with FMVSS 114. The immobilizer module may perform its monitoring function in a low power sleep mode, only becoming active as required when a change in ignition state occurs. Alternatively, the immobilizer may perform other functions while monitoring the ignition switch status and be temporarily interrupted when an ignition switch change occurs.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
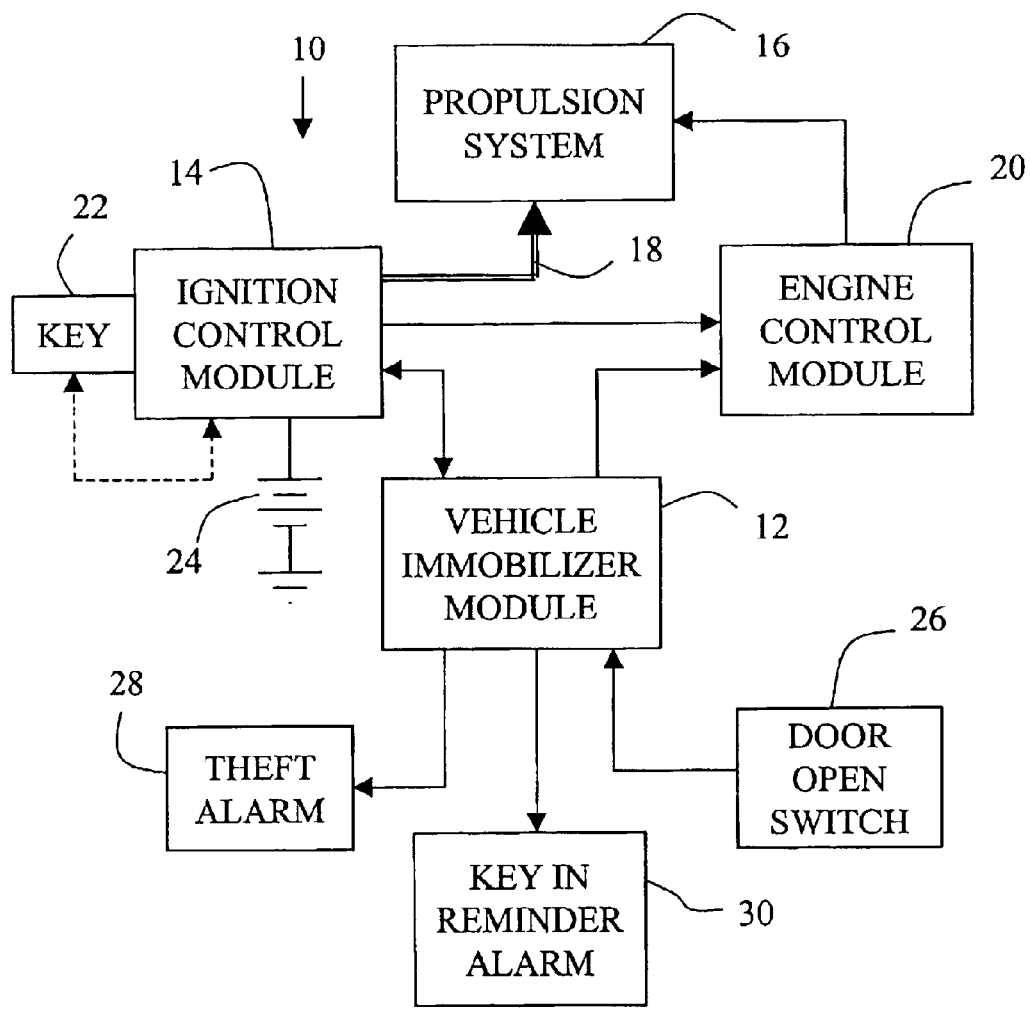
FIG. 1 is a block diagram of a vehicle having an immobilizer according to this invention.

FIG. 1 shows a motor vehicle, generally indicated by reference number 10, having an immobilizer module 12. An ignition control module 14 contains an ignition switch, not shown, that has at least one off state and one on state. In the on state, ignition control module 14 connects a source of electric power to various portions of a vehicle propulsion system 16 to enable the same; and in its off state, ignition control module 14 removes this connection so that the vehicle propulsion system is disabled. For the vehicle to be operated by propulsion system 16, it is necessary, although it may not be sufficient, that the latter be powered through the ignition control module 14. The arrow line 18 connecting ignition control module 14 and propulsion system 16 is an electric power line, whereas all other lines of FIG. 1 are communication lines, any one or more of which may take the form of a dedicated line or may equivalently represent an avenue of communication through a serial data bus providing addressed messages. FIG. 1 also shows an engine control module 20 that controls various parts of propulsion system 16 and in turn is partly controlled by immobilizer module 12.

Ignition control module 14 may be activated by a key 22, when the latter is present with the module, such as by being inserted into or placed next to a receptor internal or connected to the module, as shown in FIG. 1. For example, in a so called "keyless vehicle," the driver carries a fob on his person. Antennas in the vehicle detect the fob and perform the same immobilizer type functions. The driver only has to push a button for vehicle activation. However, for the case when the battery in the fob is dead, there is typically a location where the driver can place the fob so that power can be inductively coupled to the fob and verification can still take place. The activation of the ignition switch may be by rotating a key among two or more rotational positions, one of which selects an ignition off state and another of which selects an ignition on state; but it may also take other forms, such as pushing a button, turning a rotary switch by hand, etc. For purposes of this description, the ignition control module will, in its on state, provide electrical power from a standard vehicle electrical power source, symbolized by battery 24, to the propulsion system, where it is used to provide spark ignition, fuel pump and injector activation, etc. in the case of an internal combustion engine and operating power itself in the case of an electric motor. In the off state, the ignition control module will remove electric power from these devices and thus prevent vehicle operation.

A door open switch 26 provides a signal to vehicle immobilizer module 12 indicating the status of a vehicle door, preferably that used by the vehicle driver to enter and exit the vehicle. Such switches are commonly used in motor vehicles for warning signals. An optional vehicle theft alarm 28 is provided under control of the vehicle immobilizer module, as is a key in reminder alarm 30.

Figure 3:
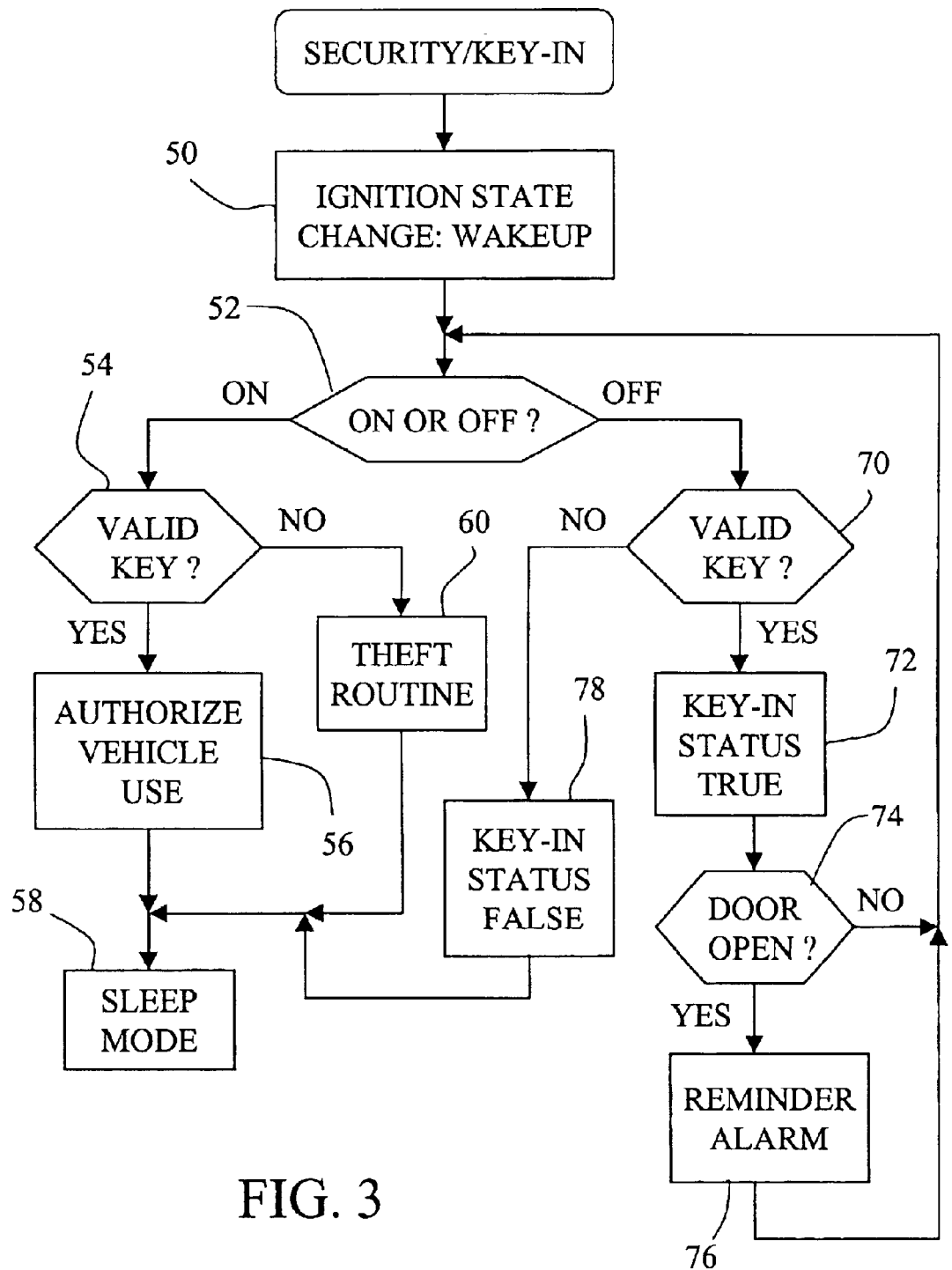
FIG. 3 is a flow chart illustrating the operation of the immobilizer of this invention in the vehicle of FIG. 1.

The operation of vehicle immobilizer module 12 relevant to this invention is described with reference to the flow chart of FIG. 3. This flow chart describes a computer routine SECURITY/KEY-IN that is preferably run on a microcomputer, not shown, in vehicle immobilizer module 12. The microcomputer has a sleep mode in which it uses minimal power waiting for a wakeup signal. Only upon receiving the wake up signal does the microcomputer start full power operation. The receipt of such a wakeup signal is indicated at step 50. This wakeup signal is generated by ignition control module 14 when the ignition state changes from an off state to an on state or vice versa. When the wakeup signal is received, the routine first determines at step 52 whether the ignition state has changed from an off state to an on state or from an on state to an off state: that is, if the new ignition state is off or on. If the change is to an on state, the immobilizer module 12 signals the ignition control module 14 to activate the transponder in key 22 and check for a valid ID code. If such a code is received back from key 22, vehicle use is authorized at step 56 and immobilizer module 12 goes back into sleep mode at step 58, wherein it remains until another wakeup signal is received. If no valid ID code is received, immobilizer module 12 optionally signals ignition control module 14 to deactivate vehicle operation and, at step 60, runs any theft detection routine that is included, which may, if theft is detected as likely, activate theft alarm 28. Whether or not theft alarm 28 is activated, at the conclusion of theft routine 60 the immobilizer module 12 returns to sleep mode at step 58.

Returning to step 52, if the change in ignition state is from an on state to an off state, immobilizer module 12 signals ignition control module 14 at step 70 to activate the transponder in key 22. If a valid ID response is received, immobilizer 12 sets a KEY IN status flag to TRUE at 72 and checks at 74 the status of the driver door, as indicated by switch 26. If switch 26 indicates an open door, the key in reminder alarm 30 is activated at step 76 and the routine returns to step 52. If the door is not indicated as open, the routine returns to step 52 without activating the key in reminder alarm 30. If no valid ID response is received at step 70, the KEY IN status flag is set to FALSE at step 78; and the routine then proceeds to step 58 to enter sleep mode.

Figure 2:
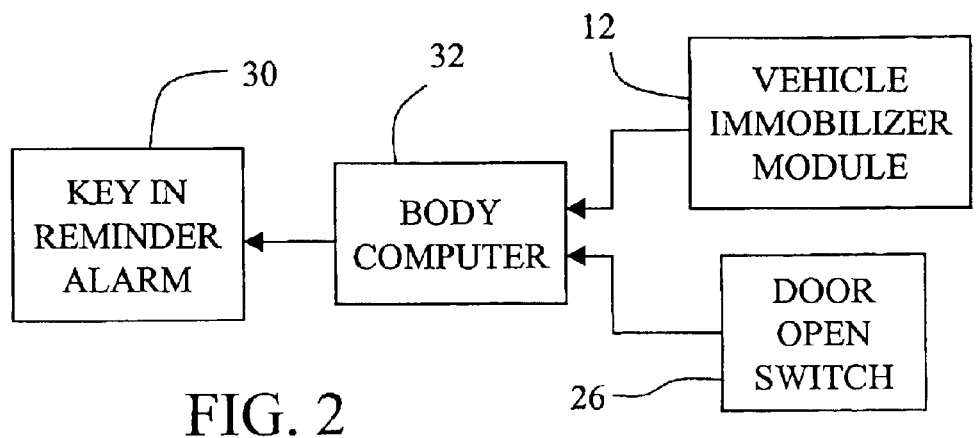
FIG. 2 is a block diagram of an alternate immobilizer arrangement embodying this invention.

FIG. 2 shows an alternate embodiment of the invention wherein door open switch 26 provides its signal to a separate body computer 32 that runs a program controlling one or more functions of the vehicle body, including the key in reminder alarm. This arrangement is common on motor vehicles. Body computer 32 further receives the value of the KEY IN status flag from immobilizer module 12 on a regular basis and internally provides programming to activate the key in reminder alarm 30 when it simultaneously receives a signal from switch 26 that the driver door is open and a message indicating a TRUE value for the KEY IN status switch. In this system, the flow chart of FIG. 3 is modified by eliminating steps 74 and 76 and providing for the routine to proceed from step 72 directly back to step 52, since the functions of steps 74 and 76 are equivalently performed in body computer 32.

In another variation of the system, the immobilizer microcomputer does not use a sleep mode. In this variation, the immobilizer computer runs a program which includes a constant monitoring of the state of the ignition switch and provides an interrupt to initiate the functions shown in FIG. 3 whenever a change in ignition state between an off state and an on state is detected. The flow chart of FIG. 3 would thus be a subroutine called by the interrupt from the main program and would return program control to the main program wherever the step in FIG. 3 indicates "sleep mode." In this way the immobilizer function can be integrated into a computer additionally performing other functions.

What is claimed is:

1. A method of providing security for a motor vehicle having propulsion apparatus and an ignition system having an on state providing electric power for operation of the propulsion apparatus and an off state withholding electric power from the propulsion apparatus, the ignition system further having a receptor for an ignition control key, the method comprising the steps:

monitoring the ignition system to detect a change between the on state and the off state;

responsive to a detected change in the ignition state, initiating electromagnetic communication apparatus in the receptor for interrogation and validation of a key therein with reference to stored security data;

if the detected change in the ignition state is from the off state to the on state, authorizing vehicle engine operation if a key in the receptor is validated and preventing vehicle engine operation if no such key is validated;

if the detected change in the ignition state is from the on state to the off state, generating a key in status datum having a first value if a key in the receptor is validated and a second value if no such key is validated; and responsive to an open state of a predetermined vehicle door while the key in status datum is generated with the first value, generating a warning signal, whereby the warning signal indicates that a key is left in the receptor with the propulsion apparatus not operating and the predetermined vehicle door open.

2. The method of claim 1 wherein the steps of monitoring the ignition system, initiating electromagnetic communication apparatus, authorizing vehicle engine operation, preventing vehicle engine operation and generating a key in status datum are performed by an immobilizer module having an active mode and a sleep mode, wherein the step of monitoring the ignition system is performed in the sleep mode, the other steps are performed in the active mode and the immobilizer returns to the sleep mode at the conclusion of the steps of authorizing vehicle engine operation, preventing propulsion apparatus operation and generating a key in status datum when the key in status datum indicates no valid key in the ignition.

3. The method of claim 2 wherein the step of generating a warning signal is performed by a computer separate from the immobilizer but responsive to the key in status datum and a sensor indicating an open state of the predetermined vehicle door.

4. A vehicle security module for use in a motor vehicle having an ignition control module, the vehicle security module comprising:

means for receiving an ignition state change signal indicating a change in ignition state between an on state and an off state;

means, responsive to the ignition state change signal indicating a change from the off state to the on state, for receiving a security code from a key present with the ignition control module and determining the validity of the received security code;

means effective, if a change from the off state to the on state is indicated and the received security code is found to be valid, to authorize operation of the vehicle;

means effective, if a change from the off state to the on state is indicated and no valid received security code is received, to prevent operation of the vehicle;

means effective, if a change from the on state to the off state is indicated and a key from which a valid security code has been received is present with the ignition control module, to generate a key in status true signal; and means effective, if a change from the on state to the off state is indicated and no key from which a valid security code has been received is present with the ignition control module, to generate a key in status false signal.

5. The vehicle security module of claim 4 further comprising means responsive to an open state of a vehicle driver door simultaneously with the key in status true signal to generate a key in warning signal.

6. The vehicle security module of claim 4 having an active mode and a low power sleep mode, wherein only the means for receiving an ignition state change signal operates in the sleep mode and all other recited means operate in the active mode, and wherein the vehicle security module returns to the sleep mode at the conclusion of any of the authorization of engine operation, the prevention of engine operation and the generation of the key in status false signal.

7. The vehicle security module of claim 6 having communication means for providing the key in status true signal externally of the vehicle security module.

8. A vehicle security system for use in a motor vehicle having an ignition control module, the vehicle security system comprising a vehicle security module comprising:

means for receiving an ignition state change signal indicating a change in ignition state between an on state and an off state;

means, responsive to the ignition state change signal indicating a change from the off state to the on state, for receiving a security code from a key present with the ignition control module and determining the validity of the received security code;

means effective, if a change from the off state to the on state is indicated and the received security code is found to be valid, to authorize operation of the vehicle;

means effective, if a change from the off state to the on state is indicated and no valid received security code is received, to prevent operation of the vehicle;

means effective, if a change from the on state to the off state is indicated and a key from which a valid security code has been received is present with the ignition control module, to generate a key in status true signal; and means effective, if a change from the on state to the off state is indicated and no key from which a valid security code has been received is present with the ignition control module, to generate a key in status false signal; and communication means for providing the key in status true signal externally of the vehicle security module, the vehicle security system further comprising a separate control module receiving the key in status true signal and generating a key in warning signal when it simultaneously receives a signal indicating that a vehicle driver door is open.

* * * * *